(No Model.)
F. A. WILLIAMS.
MEANS FOR JOINING EDGES OF SHEET, STRIP, OR PLATE METAL.
No. 530,314. Patented Dec. 4, 1894.
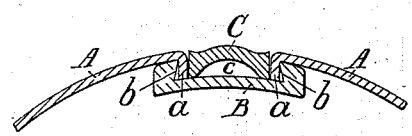
Fig. 1.
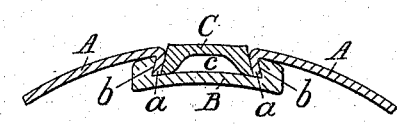
Fig. 2.
Fig. 3.
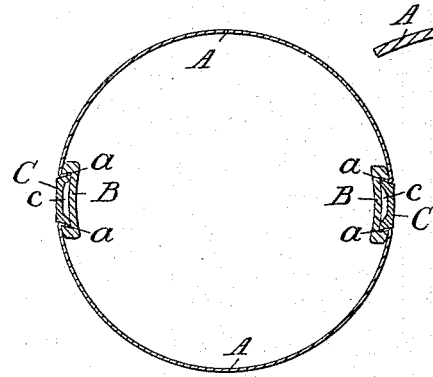
Fig. 4.
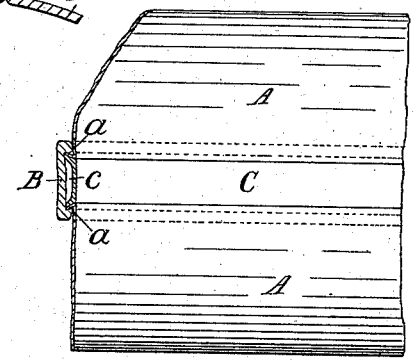
Fig. 5.
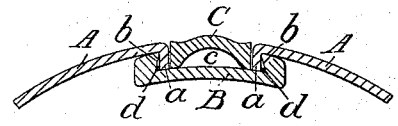
Fig. 6.
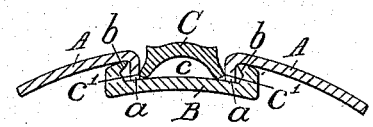
Fig. 7.
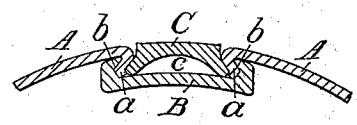
Fig. 8.
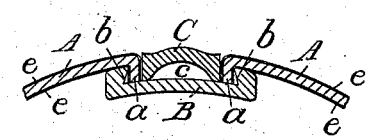
Fig. 9.
Fig. 10.
Fig. 11.
Witnesses:
Peter A. Ross
Herbert Blossom
Inventor:
Frank A. Williams
by Henry Connett
his Attorney

UNITED STATES PATENT OFFICE.

FRANK ARTHUR WILLIAMS, OF ALBRIGHTON, ENGLAND.

MEANS FOR JOINING EDGES OF SHEET, STRIP, AND PLATE METAL.

SPECIFICATION forming part of Letters Patent No. 530,314, dated December 4, 1894.

Application filed November 3, 1892. Serial No. 450,826. (No model.) Patented in England July 28, 1892, No. 13,760; in Germany November 22, 1892, No. 73,201; in Belgium August 17, 1893, No. 106,014; in Cape of Good Hope August 19, 1893, No. 860; in New South Wales September 4, 1893, No. 4,609; in South Australia September 4, 1893, No. 2,556; in Victoria September 6, 1893, No. 10,799; in New Zealand September 11, 1893, No. 6,414, and in India January 31, 1894, No. 7.

*To all whom it may concern:*

Be it known that I, FRANK ARTHUR WILLIAMS, a subject of the Queen of Great Britain, residing at Albrighton, in the county of Salop, England, have invented certain new and useful Improvements in Means or Devices for Joining the Edges of Sheet, Strip, and Plate Metal, for the purpose, more especially, of facilitating and improving the manufacture of tubes, cisterns, and other hollow metallic articles, (for which patents have been granted to me in Great Britain, No. 13,760, dated July 28, 1892; in Germany, No. 73,201, dated November 22, 1892; in Belgium, No. 106,014, dated August 17, 1893; in Cape of Good Hope, No. 860, dated August 19, 1893; in New South Wales, No. 4,609, dated September 4, 1893; in South Australia, No. 2,556, dated September 4, 1893; in Victoria, No. 10,799, dated September 6, 1893; in New Zealand, No. 6,414, dated September 11, 1893, and in India, No. 7, dated January 31, 1894,) of which the following is a specification.

Tubes, cisterns, and other hollow articles made up of sheet, strip or plate metal of which one or more edges are securely joined together, have, according to the usual methods of manufacture, such edges joined by riveting, welding, brazing or soldering. All these methods are more or less unsatisfactory, and in some cases it is almost impracticable to make a really pressure tight joint by any of them; and, moreover, the employment of such methods necessitates, as a rule, the use of thicker metal than would be necessary if a joint could be made which was as strong as the solid or main portion of the sheet, strip or plate metal.

Now, according to this invention, two edges of sheet, strip or plate metal are joined together by the use of a device comprising two members, a channel-piece and a key, whereby riveting, welding, brazing or soldering is avoided, and the joint is as strong or nearly as strong as the solid portion of the sheet, strip or plate metal. The channel-piece or female member employed consists of a bar of metal of the required length, formed channel-shaped in transverse section, of which the sides of the channel are preferably undercut in shape making the channel wider at the bottom, or at a point between the bottom and top, than at the top. The key or male member employed is also a bar of metal of the length of the channel-piece, and is so formed that it will wedge laterally in the channel of the female member, being preferably constructed of an arched or analogous shape in transverse section so that when said arched back is flattened down by pressure the key will be laterally expanded.

The edges of the sheet, strip, or plate metal to be joined are turned down or flanged so that they may be placed inside the channel of the female member and engage the shoulders formed thereby.

The key is of a width to allow of its being just easily placed, with its concave side inward, within the channel after the flanged edges of the sheet, bent as aforesaid, have been placed therein and drawn apart from one another as far as the sides of the channel will allow; and when the key has been thus placed within the channel the arch or back is hammered or pressed down so as to expand the key laterally or widthwise and cause it to press firmly against the portions of the sheet, strip, or plate metal, which are within the channel, and to tightly grip such portions between the sides of the key and the sides of the channel. The sheet, or sheets thus joined may be coated both outside and inside, or on but one face, if desired with a layer of other metal, and the edges of such coating will be turned down similarly as the edges of the metal which is coated thereby, and be placed therewith in the channel; and there will be two (or three) thicknesses of metal on each side to be gripped between the sides of the key and the sides of the channel.

The invention is capable of modification in detail, as will be hereinafter described.

The invention is illustrated in different embodiments in the accompanying drawings. The illustrations are given, by way of example, as showing the application of the invention to the joining of sheet, strip or plate metal used in building up or forming pipes or other articles of cylindrical or other forms.

Figure 1 is a transverse section through a joint after an expansible key has been placed within the channel-piece, but previously to such key being expanded to complete the joint. Fig. 2 is a corresponding view to Fig. 1, but shows the key expanded and the joint thus completed. Fig. 3 is a corresponding view to Fig. 2, but illustrates a joint in which the channel piece is on the exterior side or face of the cylinder. Fig. 4 is a section on a smaller scale of a tube or other article of a circular or rounded form in which the sheet metal making up the whole circumference is joined in two places. Fig. 5 is a short length of the outside of the tube shown in Fig. 4, and shows the exterior of one of the joints. Fig. 6 is a view corresponding to Fig. 1 but shows a packing of lead or other suitable packing material inserted between the edges of the metal to be joined and the sides of the channel. Fig. 7 illustrates another and slightly different form of channel-piece and expansible key, the key being shown prior to being expanded to tighten the joint. Fig. 8 is a corresponding view to Fig. 7, but shows the key expanded and the joint thereby completed. Fig. 9 illustrates the application of the joint in the case of sheet, strip or plate metal which is coated, both outside and inside, with a layer of other metal. Figs. 10 and 11 illustrate other applications of the invention which will be hereinafter described.

In the joint illustrated by Figs. 1 and 2, A A are two sheets, strips or plates of metal to be joined together. B is the channel-piece or female member and C the expansible key, or male member, formed of an arched shape in cross section which leaves a hollow c along its inner face. The channel is shown as formed with undercut sides. To make the joint, the edges a a of the sheet metal are first bent back or flanged and inserted within the channel of the female member, as shown by Fig. 1, and the key is then placed within the channel and between the edges a a, and is finally hammered or pressed down and thereby laterally expanded, as shown in Fig. 2, and presses out the edges a a against the undercut sides b b of the channel, and grips such edges between itself and the sides of the channel. The edges a a may be originally bent to fit against the undercut sides of the channel, if desired, so that when the key is expanded it simply grips such edges between itself and the sides of the channel without having first to press said edges into position. The outer corners of the key may be calked into the joint between themselves and the bent corners of the sheets, if desired, as an additional precaution against leakage; and for this purpose, they may be shaped with the corners projecting slightly upward, as shown.

In Fig. 4 a tube or other article of rounded form is shown in transverse section, the whole circumference being made up of two pieces of sheet metal. The two pairs of edges are shown as joined in the manner illustrated by Figs. 1 and 2.

The outer view of a joint, as shown in Fig. 5, presents merely a plain strip constituting the back of the key C; but the channel-piece may, if desired, be outside the tube or article in respect of which it is used in making a joint, instead of inside.

A joint in which the channel-piece is exterior is shown by Fig. 3. In this case the back of the key is approximately flush with the interior of the tube or other article.

Fig. 6 is a view corresponding in all respects with Fig. 1, except that a lead or other soft metal strip or wire, d, is placed in the angle of the channel on each side, so as to form a packing or jointing material between the edges a a of the metal to be joined and the undercut sides of the channel; and this soft metal is spread out to a very thin film by the pressure exerted by the expansion of the key. Other jointing material, such for instance as fibrous packing, or red lead, may be used if desired.

In the joint illustrated in Figs. 7 and 8 the undercut sides of the channel are formed of an angular shape in cross section, as shown, and the key C is formed with sharp edges c' which, as the key is expanded by hammering or pressing down, sink into the metal of the edges a a and force such edges to assume the angular shape of the undercut sides of the channel, as shown in Fig. 8.

Fig. 9 is a view corresponding in all respects to Fig. 1, except that the sheet metal A A is shown to be coated, both outside and inside, with a layer or sheet e of other metal; that is to say, supposing for instance the sheet metal A A to be of steel or iron, the layers of metal e may be of brass or aluminium or other desired coating metal.

In some instances, such as in the case of tubes of say from three to ten inches diameter, the entire circumference may be made up of a single sheet, strip or plate of which the edges will be joined together in the manner of this invention.

Joints made in the manner above described may be made cold.

The distinguishing feature of the joint formed according to my invention is that there is no swaging, forging, or molding of the metal of the key as would be the case if a bar or calking strip of malleable metal were placed in the channel between the edges of the sheet and then forcibly compressed by blows. On the contrary, the elevated or arched crown of the key is merely bent in such a way as to expand the key laterally like a toggle. As the channel is undercut or dovetailed, the lower, lateral margins of the key are thus thrown outward as clearly shown so as to expand the key most at its lower or inner face.

In testing tubes of large diameter made in the ordinary manner, a considerable quantity of water is required, as each tube must be filled before the pressure can be put on;

but in the case of tubes in which joints are made in the manner of this invention each joint may be tested by simply filling with water the space formed by the hollow of the key and subjecting the water to the required pressure; and such a test will usually be sufficient, because ordinarily the test is made simply to ascertain that the joints will stand good. Moreover, if a joint is found to be leaky at any point it can readily be made good by hammering down the key at such point and thereby further expanding it and thus causing its sides to bear at such point more tightly against the edges a a.

If one of the sheets, strips or plates which has been used in making up an article has become damaged and needs replacing, the same can readily be removed by first cutting longitudinally through the backs or crowns of the keys by which it has been joined in place, and then removing the keys from the channel-pieces.

It will be obvious that joints as above described may be used for articles varying greatly in shape. In using it for the longitudinal joints of taper tubes, and other taper articles, the joint will be the same, or substantially the same, as for parallel-sided tubes or other parallel-sided articles. When a curved joint is required, such as for a joint passing over the end of a dome-shaped article, the channel-piece and key will be, of course, curved longitudinally to suit the curve of the sheets, strips or plates to be joined. If the joint is used for the corner of a tank or cistern or like article, the channel-piece will be, of course shaped on each side to allow of the two sheets or plates of metal which are joined together at the corner to pass away from the joint in directions at right angles to one another. This form of the device is illustrated in Fig. 10. The shape of the outer sides of the channel-piece may of course be varied as required to suit the different shapes of articles in respect of which the joint is used.

Properly spaced, parallel plates may be joined also by the form of the device illustrated in Fig. 11, and this may prove useful in some constructions.

Having thus described my invention, I claim—

A device for joining together the edges of sheets or plates of metal, consisting of a female member having a channel to receive the edges to be joined and those of a securing key, and the said key having a concave-convex, substantially arched contour when seen in transverse section, whereby, when said key is in place in the channel, it may be expanded laterally by flattening its relatively thin crown.

In witness whereof I have hereunto signed my name in the presence of two subscribing witnesses.

FRANK ARTHUR WILLIAMS.

Witnesses:
STEPHEN WATKINS,
ROBERT G. GROVES.